(12) United States Patent
Altieri et al.

(10) Patent No.: US 6,746,705 B2
(45) Date of Patent: Jun. 8, 2004

(54) THERMALLY CONVERTED STARCHES AND THE METHOD OF PREPARATION THEREOF

(75) Inventors: Paul A. Altieri, Belle Mead, NJ (US); Faith L. Ricketts, North Plainfield, NJ (US); Daniel B. Solarek, Hillsborough, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 405 days.

(21) Appl. No.: 09/922,186

(22) Filed: Aug. 3, 2001

(65) Prior Publication Data

US 2003/0031775 A1 Feb. 13, 2003

(51) Int. Cl.$^7$ ............................ A23L 1/238; A23L 1/40
(52) U.S. Cl. ........................................ 426/589; 426/576
(58) Field of Search ................................. 426/589, 576

(56) References Cited

U.S. PATENT DOCUMENTS

| | | | |
|---|---|---|---|
| 2,845,368 A | 7/1958 | Frederickson | 127/38 |
| 3,479,220 A | 11/1969 | Ferrara | 127/38 |
| 3,967,975 A | 7/1976 | Idazak | 127/23 |
| 4,280,851 A | 7/1981 | Pitchon et al. | 127/33 |
| 4,465,702 A | 8/1984 | Eastman et al. | 426/578 |
| 4,510,166 A | 4/1985 | Lenchin et al. | 426/565 |
| 4,587,332 A | 5/1986 | Lane et al. | 536/102 |
| 5,149,799 A | 9/1992 | Rubens | 536/102 |
| 5,380,717 A | 1/1995 | Ohkuma et al. | 514/58 |
| 5,410,035 A | 4/1995 | Wakabayashi et al. | 536/103 |
| 6,221,420 B1 | 4/2001 | Thomas et al. | 426/578 |

FOREIGN PATENT DOCUMENTS

| | | | |
|---|---|---|---|
| DD | 1573 47 | 11/1982 | |
| EP | 0 368 451 | 12/1989 | C08B/30/18 |
| EP | 0 485 304 | 8/1991 | C12P/19/14 |
| EP | 0 616 776 | 3/1994 | A23K/1/16 |
| EP | 0 953 579 | 3/1999 | C08B/30/18 |
| GB | 853828 | 7/1958 | |

OTHER PUBLICATIONS

J. Science Food Agriculture, 1998, 77(1), p. 103.
Modified Starches: Properties and Uses, O.B. Wurzburg, CRC Press Inc, Florida (1986).
"Starch Chemistry and Technology", Second Edition, edited by Roy L. Whistler, et al., Chapter X: Starch Derivative: Production and Uses by M. W. Rutenberg, et al., Academic Press, Inc., 1984.
XP–002219692 Abstract.
XP–002219691, Acid–Modified Starch: Production and Uses, Robert B. Rohwer and Robert E. Klem, Starch: Chemistry and Technology, Whistler R.L., New York, Academic Press, Orlando, US, ED, 2 pp. 529–541.

*Primary Examiner*—N. Bhat
(74) *Attorney, Agent, or Firm*—David P. LeCroy

(57) ABSTRACT

The present invention provides an efficient acid conversion process by which native and modified starches may be treated to afford products with low viscosity and a higher proportion of lower molecular weight compounds than the corresponding aqueous acid conversion processes. Such converted starches demonstrate unique properties and, accordingly, are useful in a variety of products.

9 Claims, No Drawings

THERMALLY CONVERTED STARCHES AND THE METHOD OF PREPARATION THEREOF

FIELD OF THE INVENTION

The present invention relates to a process for converting starches. More particularly, the invention relates to an acid conversion process whereby products having low viscosity and high levels of lower molecular weight compounds can be obtained.

BACKGROUND OF THE INVENTION

Starches normally have good thickening properties because of their high molecular weight polymeric components. For applications that typically utilize a high starch (i.e., solids) content, such as adhesives, candies and food coatings, the common practice is to use starches that have been converted. The conversion process results in starch products that contain reduced molecular weight polymers and exhibit reduced viscosity.

The most common conversion methods used in the starch industry include acid hydrolysis, oxidation, pyroconversion, and enzyme conversion. Except for enzyme conversion, granular starch is used in the modification processes for ease of recovery. This recovery process generally involves a suspension of the final starch product in water, neutralizing the pH, then filtering out the starch product and washing the product with water. Such a process generally removes salts and charged particles, including the smaller molecular weight side products created during conversion.

The use of aqueous methods to convert starch which utilize the above described recovery method are well-known and described, for example, in publications such as "Starch: Chemistry and Technology", Second Edition, edited by Roy L. Whistler et al., Chapter X; Starch Derivatives: Production and Uses by M. W. Rutenberg et al., Academic Press, Inc. 1984.

There is a continuing need for an alternative conversion process that provides starches having lower viscosity and high levels of lower molecular weight compounds not heretofore observed in the art.

SUMMARY OF THE INVENTION

The present invention relates to a process for converting starches. More particularly, the invention relates to an acid conversion process whereby products having low viscosity and high levels of lower molecular weight compounds can be obtained.

The process of the invention comprises mixing a base starch with acid, drying the mixture to a substantially anhydrous state and heating the dried mixture for a sufficient time to produce a converted starch having a funnel flow viscosity of from about 5 to about 50 seconds.

The dry converted starches prepared via the foregoing process have a higher level of low molecular weight compounds than corresponding dry converted starches prepared via conventional aqueous acid conversion processes. The converted starches of the present invention demonstrate unique properties and, accordingly are useful in a number of products including adhesives, encapsulation matrices, confectioneries and paper surface sizing products.

DETAILED DESCRIPTION OF THE INVENTION

The present invention relates to a process for converting starches with acid to give products having low viscosity and high levels of lower molecular weight compounds.

All starches and flours (hereinafter "starch") may be suitable for use as the base starch herein and may be derived from any native source. A native starch as used herein, is one as it is found in nature. Also suitable are starches derived from a plant obtained by standard breeding techniques including crossbreeding, translocation, inversion, transformation or any other method of gene or chromosome engineering to include variations thereof. In addition, starches derived from a plant grown from artificial mutations and variations of the above generic composition which may be produced by known standard methods of mutation breeding are also suitable for use as the base starch herein.

Typical sources for the base starches are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. As used herein, the term "waxy" is intended to include a starch or flour containing at least about 95% by weight amylopectin and the term "high amylose" is intended to include a starch or flour containing at least about 40% by weight amylose.

Chemically modified starches may also be used as the base starch. Such chemical modifications are intended to include, without limitation, crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Procedures for modifying starches are well-known and described, for example in *Modified Starches: Properties and Uses*, Ed. Wurzburg, CRC Press, Inc., Florida (1986).

Physically modified starches may also be used as the base starch, including, without limitation, thermally inhibited or pregelatinized starches. Procedures for preparing thermally inhibited starches are disclosed, for example, in U.S. Pat. No. 6,221,420, and references disclosed therein, the disclosure of which is incorporated by reference. Exemplary processes for preparing pregelatinized granular starches are disclosed in U.S. Pat Nos. 4,280,851, 4,465,702, 5,037,929, and 5,149,799, the disclosures of which are incorporated by reference.

Whereas starches acid converted via conventional processes have been produced by dispersing the granular starch in water and adding acid to the mixture, it has now been discovered that mixing a base starch with acid, drying the mixture to a substantially anhydrous state and heating the dried mixture for a sufficient time to produce a converted starch having a funnel flow viscosity of from about 5 to about 50 seconds produces a starch having unique properties.

By a substantially anhydrous state means the starch mixture is dried to a moisture content of less than about 1%.

Generally, a base starch having less than about 18% moisture, is placed into a reactor having a convective and conductive energy source. Such reactors include, without limitation, a fluidized bed, a thin layer thermal reactor or a pressurized mixer equipped with vacuum and a heated jacket. A fluidizing gas (e.g. air) is then introduced at a rate whereby the starch is suspended in the reactor bed. Anhydrous acid (e.g. hydrochloric acid) and a carrier gas (e.g. nitrogen), are injected directly into the fluidizing gas of the fluidized reactor to effect the mixture of the starch and acid.

The temperature of the bed is increased to a temperature in the range of between about 50 to about 135° C. The increase in temperature may be accomplished by means well known in the art including, without limitation, an oil-heated jacket or via a heated air source, or combinations thereof. Depending on the degree of acidification and initial moisture content, the reaction is typically completed within about 3 minutes to about one hour. Where the process is continuous, the process typically takes from about 3 minutes to about 30 minutes. A batch process is typically completed in from about 30 minutes to about one hour. While the reaction is substantially complete in less than about one hour, longer periods of heating, e.g. up to about 6 to about 8 hours or more, may be used without substantial deterioration of the final converted product. After the process is complete, the reactor is cooled and the starch discharged and used without the need for further purification.

In contrast, a conventional aqueous acid conversion process typically requires from about 12 to about 20 hours, and relatively more acid to effect the conversion of the starch, as well as additional purification and processing in the form of neutralization, filtration and drying. Since the purification process washes out low molecular weight components, the converted starches of the present invention which do not require purification, demonstrate a greater level of low molecular weight components than the corresponding converted starches prepared via a conventional aqueous procedure.

By adjusting the moisture content, degree of acidity and reaction conditions, the efficient process of the present invention may be tailored to produce a converted starch containing differing levels of lower molecular weight components. Additionally, the anhydrous process of the present invention enables the production of highly converted starches in a highly controlled and reproducible manner having a composition that would not allow for recovery if reacted in the presence of water (i.e., traditional aqueous batch processing). For example, products having a higher degree of conversion, which cannot easily be recovered from water, can be accomplished by preparing the starch according to the process of the present invention.

The starch compositions produced via this process demonstrate unique performance in certain products. Adhesives and encapsulation matrixes, for example, often require the addition of low molecular weight oligosaccharides or sugars to be added to the formulation for optimum performance. The starch compositions of the present invention advantageously provide desirable products without the need for the addition of lower molecular weight components. Further, the starches of the present invention are useful in products requiring unique gels and textures, including, for example confectioneries and paper surface sizing applications.

The following methods and examples are presented to further illustrate and explain the present invention and should not be taken as limiting in any regard. All parts and percentages are given by weight and all temperatures in degrees Celsius (° C.) unless otherwise noted.

EXAMPLES

In the examples, the following test procedures were used.
Measurement of Flow Viscosity Flow viscosity, also referred to herein as funnel flow viscosity, may be measured as follows. First, the starch must be collected and dried to below 12% moisture in an oven. After the moisture content is determined, tare a stainless steel beaker and thermometer. Add 19% starch to distilled water for a total of 300 g of starch and water. Cook the mixture in a boiling water bath for 15 minutes, stirring for the first 5 minutes. Cover the stainless steel beaker for the remaining 10 minutes. After the cook is complete, remove the beaker from the boiling water bath and cool to 80° F. Bring the beaker back to the original weight before the cook with distilled water and continue cooling to 72° F. Transfer the contents of the beaker to a 100 ml cylinder.

Flow viscosity, also referred to herein as funnel viscosity, is measured using a fixed orifice viscosity funnel, and is a measurement of the time it takes 100 mL of the cook to pass through the orifice. The funnel used to measure flow viscosity is a standard 58 degree, thick-wall, heat resistant glass funnel whose top diameter is about 9 to about 10 cm with the inside diameter of the stem being about 0.381 cm. The glass stem of the funnel is cut to an approximate length of 2.86 cm from the apex, carefully fire-polished, and refitted with a long stainless steel tip which is about 5.08 cm long with an outside diameter of about 0.9525 cm. The interior diameter of the steel tip is about 0.5952 cm at the upper end where is attached to the glass stem and about 0.4445 cm at the outflow end with the restriction in the width occurring at about 2.54 cm from the ends. The steel tip is attached to the glass funnel by means of a Teflon tube. The funnel is calibrated so as to allow 100 mL of water to go through in six seconds using the procedure described below.

A finger is placed over the orifice of the funnel and the contents are poured from the cylinder into the funnel. A small amount is allowed to flow back into the cylinder to remove trapped air. The balance is poured back into the funnel, and the cylinder is inverted over the funnel, and the contents are allowed to drip from the cylinder into the funnel. The finger is removed from the orifice of the funnel and the length of time is recorded that takes 100 ml of the sample to flow through the apex of the funnel. This time is the flow viscosity of the starch sample.

Measurement of Water Fluidity

Water fluidity (WF), as used herein, is an empirical test of viscosity measured on a scale of 0–90 wherein fluidity is inversely proportional of viscosity. Water fluidity of starches is typically measured using a Thomas Rotational Shear-type Viscometer (commercially available from Arthur A. Thomas CO., Philadelphia, Pa.), standardized at 30° C. with a standard oil having a viscosity of 24.73 cps, which oil requires 23.12±0.05 sec for 100 revolutions. Accurate and reproducible measurements of water fluidity are obtained by determining the time which elapses for 100 revolutions at different solids levels depending on the starch's degree of conversion: as conversion increases, the viscosity decreases and the WF values increase.

Measurement of Retained Solids in Converted Starches

Starch (5 grams) is added to 95 grams of water and stirred for 20 minutes. The slurry is filtered through fluted filter paper. The filtrate is collected on the lens of a calibrated starch refractometer (calibrated to zero using water) where the % solubles is measured.

Measurement of Starch Color (L value)

A Hunter ColorQUEST spectrocolorimeter sphere model (commercially available from Hunter Associates Laboratory, Inc., Reston, Va.) equipped with an NIR compression cell with quartz window (commercially available from Bran-Luebbe, Inc., Buffalo Grove, Ill.) is used to measure color according to the manufacture's instructions using the following parameters:
Scale=L, Observer angle=10, Illuminant=D65, Reflectance setting=RSIN, Viewing area Size=LAV and Ultraviolet Filter=out.

Example 1

Preparation of a Thermally Converted Starch

Corn starch (4000 grams, obtained from National Starch and Chemical Co.) substituted with 5% propylene oxide was added to a laboratory model fluid bed dryer (6 inch diameter by 15 inch high, Procedyne Corporation, New Brunswick, N.J.). The starch was fluidized with air in order to suspend the starch in the bed.

Anhydrous HCl gas (3.1 grams) is metered into the bed thorough the distributor plate. This produced a starch having a pH of 2.9. The amount of HCl added was determined by measuring the weight loss of the gas cylinder prior to and after the delivery of the gas into the reactor. Nitrogen gas was used to purge all lines prior to and after the addition of the acid in order to ensure that the actual amount of acid was contacted with the starch.

The temperature of the air flowing into the bed and the temperature of the bed's jacket was then raised to a temperature of 104° C. After 1 hour the starch was discharged from the bed. The resulting product had a funnel viscosity of 15.2 seconds and a white color similar to the initial starting material.

Example 2

Comparison of the Relative Efficiency and Products of Aqueous and Thermal Conversion This example illustrates the efficiency of the thermal conversion process as well as the nature of the products compared to the process and products of a conventional aqueous conversion method.

An acid converted starch was produced according to conventional techniques using an aqueous slurry of starch. Briefly, a stirred 40% solids slurry of native tapioca starch was adjusted to a temperature of 52° C. in a water bath. Concentrated hydrocholoric acid was added directly to the slurry and the reaction mixture stirred for 14 hours. The reaction mixture was adjusted to a pH of 4.5 using sodium carbonate and then to a final pH of 5.5 with dilute sodium hydroxide. The resulting converted starch was washed with water, filtered out of solution and allowed to air dry. Three different trials were conducted on the tapioca starch via this "aqueous" method utilizing different amounts of acid to obtain three converted starches having different water fluidities (Samples A, B, and C).

For comparison, three samples of the native tapioca starch were converted (Samples D, E and F) according to the method of Example 1 to different water fluidities. This did not require differing amounts of acid.

Their water fluidities ("WF"), amount of retained solids and color values of Samples A–F were measured according to the Methods described above. The data obtained is recorded in Table 1.

TABLE 1

| Sample # | Method of Conversion | % Acid Used (by weight of dry starch) | WF | Retained Solubles (%) | Color (Hunter "L" value) |
|---|---|---|---|---|---|
| A | aqueous | 0.7 | 67 | 0.52 | 92.9 |
| B | aqueous | 1.15 | 77 | 0.79 | 92.4 |
| C | aqueous | 2.00 | 80 | 1.57 | 92.5 |
| D | dry | 0.38 | 78 | 4.10 | 93.0 |
| E | dry | 0.38 | 83 | 30.1 | 93.7 |
| F | dry | 0.38 | 90 | 79.8 | |

TABLE 1-continued

| Sample # | Method of Conversion | % Acid Used (by weight of dry starch) | WF | Retained Solubles (%) | Color (Hunter "L" value) |
|---|---|---|---|---|---|
| D | dry (washed) | | | 0.5 | |
| E | Dry (washed) | | | 4.9 | |
| F | Dry (washed) | | | 16.9 | |

As can be seen from the data presented in the Table, the thermally converted starches of the present invention (made according to the "dry" method) achieve higher degrees of conversion, as expressed by relative water fluidities, than the aqueous method of conversion ("aqueous") while using less acid, demonstrating that the dry conversion method is a more efficient process.

The difference in processes did not negatively impact the color of the converted starches as demonstrated by the comparable color values of the final products. Further, the products of the thermal conversion may be used without washing and, accordingly, advantageously retain a much higher level of low molecular weight solids. Alternatively, the thermally converted starches may be washed to manipulate the degree of solubles content.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A process for converting starch comprising mixing a base starch with an acid, drying the mixture to a substantially anhydrous state and heating the dried mixture for a time sufficient to produce a converted starch having a funnel flow viscosity of from about 5 to about 50 seconds.

2. The process of claim 1 wherein the process is achieved via a fluidized bed conditions.

3. The process of claim 1 wherein the dried mixture is heated for less than about one hour.

4. The process of claim 1 wherein the process is conducted as a batch process.

5. The process of claim 1 wherein the process is conducted as a continuous process.

6. A converted starch prepared according to the method of claim 1.

7. A product comprising the starch of claim 6.

8. The product of claim 7 wherein the product is selected from the group consisting of adhesives, encapsulation matrices, confectioneries and paper surface sizing applications.

9. A method of using the converted starch of claim 6 to confer unique gelling and textural properties to products.

* * * * *